Nov. 1, 1960     H. J. BLUM ET AL     2,958,347
BAND SAWING MACHINE AND CONTROLS
Filed April 17, 1957     8 Sheets-Sheet 1

Inventors
Frank J. Lindholm
Harry J. Blum
Frederick J. Blum
Carlson, Pitzner, Hubbard & Wolfe
Attorneys Nov. 1, 1960  H. J. BLUM ET AL  2,958,347
BAND SAWING MACHINE AND CONTROLS
Filed April 17, 1957  8 Sheets-Sheet 5

Inventors
Frank J. Lindholm
Harry J. Blum
Frederick J. Blum
Carlson, Pitzner, Hubbard & Wolfe
Attorneys United States Patent Office 2,958,347
Patented Nov. 1, 1960

2,958,347

BAND SAWING MACHINE AND CONTROLS

Harry J. Blum, Chicago, Frank J. Lindholm, Park Ridge, and Frederick J. Blum, West Chicago, Ill., assignors to Armstrong-Blum Manufacturing Company, Chicago, Ill., a corporation of Illinois Filed Apr. 17, 1957, Ser. No. 653,355

6 Claims. (Cl. 143—17)

The invention relates to band saws generally and more particularly to metal cutting band saws.

One object of the invention is to provide an improved mounting for the blade supporting structure of a band saw which insures smooth accurate feeding of the blade to the work.

Another object is to provide a translatable mounting or carriage for the saw carrying structure supported and guided in a novel manner which effectually eliminates binding and insures smooth, true running when driven by a single reciprocating actuator located at one side of the carriage.

Another object is to provide a translatable mounting for a band saw supporting carriage which materially simplifies the construction and assembly operations and which effectively restrains the structure against movement in any direction transversely of its intended reciprocatory path.

Another object is to provide improved controls which, as an incident to the clamping of a workpiece, are automatically preset to interrupt the feed of the saw blade as it finishes a cut.

Another object is to provide an improved mounting for the blade supporting and driving wheels of a band saw affording quick and easy adjustment for proper tracking of the blade.

Another object is to provide improved means for driving the blade supporting wheel.

Still another object is to provide improved pressure fluid operated means for maintaining the blade under predetermined tension.

A further object is to provide an improved work clamp for band saws embodying effective means for preventing deformation of tubular workpieces.

It is also an object of the invention to provide a metal cutting band saw of simple rugged construction which is capable of giving long troublefree service in heavy duty operation and which is easily set up and adjusted for the performance of any metal sawing operation.

Other objects and advantages of the invention will become apparent from the following detailed description of the preferred embodiment illustrated in the accompanying drawings in which—

Fig. 16 (Sheet 8) is a diagram showing the hydraulic operating circuit and the associated electrical control system of the band saw.

While a preferred embodiment of the invention has been shown and will be described herein, it is not intended that the detailed character of the disclosure should limit the invention to such particulars. On the contrary, the intent is to cover all modifications and adaptations falling within the spirit and scope of the invention as more broadly or generally characterized in the appended claims.

GENERAL

For purposes of illustration the invention has been shown as incorporated in a metal cutting band saw having a hollow, generally rectangular base 20 with a horizontally disposed work supporting table 21 at its upper forward end. The table 21 is formed with a central longitudinal slot 22 defining a passage for the operating portion of an endless flexible saw blade 25 carried by a C-shaped column 26 supported for movement in a fore-and-aft direction on the base. T-slots 27 are provided in the top surface of the table 21 for the accommodation of clamping devices such as the clamp device 30 shown for rigidly securing work in place while it is being sawed.

Saw column

The saw supporting column 26 in its preferred form comprises an elongated generally upright hollow frame member 31 rigidly connecting upper and lower wheel housings 32 and 33. Journalled within the respective housings are upper and lower band wheels 34 and 35 (Figs. 5 and 6) for supporting and guiding the endless band constituting the saw blade 25. One of the wheels, in this instance, the lower wheel 35, is rotatably driven to drive the blade 25.

Figure 1:
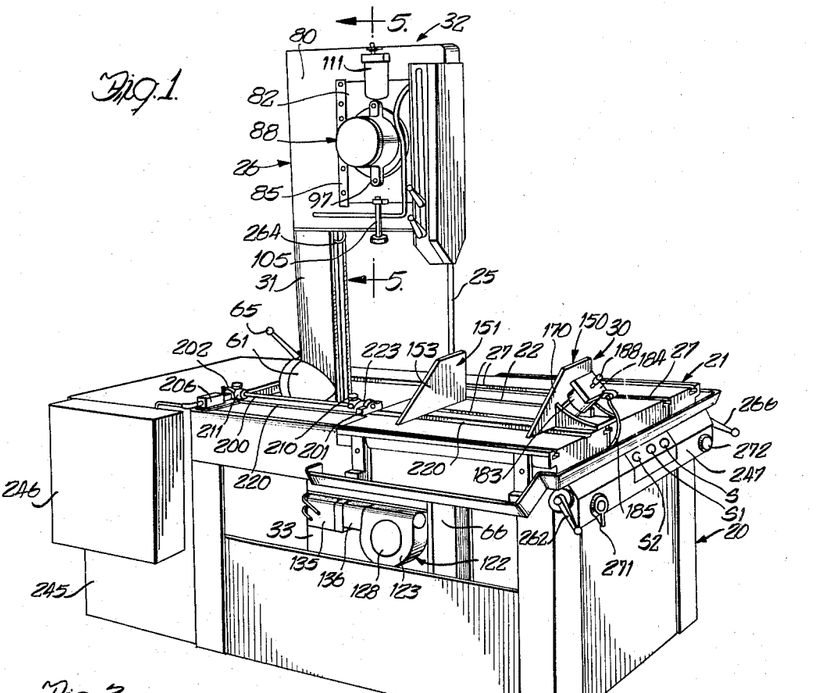
Figure 1 is a perspective view of a band saw embodying the features of the invention.

As will be seen by reference to Fig. 1, the housings 32 and 33 project forwardly from the frame member 31 and the wheels 34 and 35 are journalled therein so that the operating portion of the saw blade is spaced a substantial distance forwardly of the frame member 31. The saw blade can thus be fed through the slot 22 a substantial distance without interference from the frame member. Suitable guide means (not shown) which may be of any preferred type, such as that disclosed in the Blum application, Serial No. 632,473, filed January 4, 1957, issued November 24, 1959 as Patent No. 2,914,101, is provided on each of the wheel housings for deflecting the operating portion of the blade 25 into the plane of reciprocation of the column.

Column support

In accordance with one aspect of the invention, novel means is provided for supporting and guiding the column 26 in its reciprocatory feeding and retracting movements. This supporting and guiding structure is particularly characterized by the rigid support afforded the column which enables the saw to cut even the heaviest work with a high degree of precision. More particularly, the supporting and guiding structure effectively restrains the column against any movements other than those involved in feeding the saw to the work and returning it to retracted position. It also materially simplifies the construction and assembly of the saw and permits the use of very simple and efficient feed mechanism.

Figure 2:
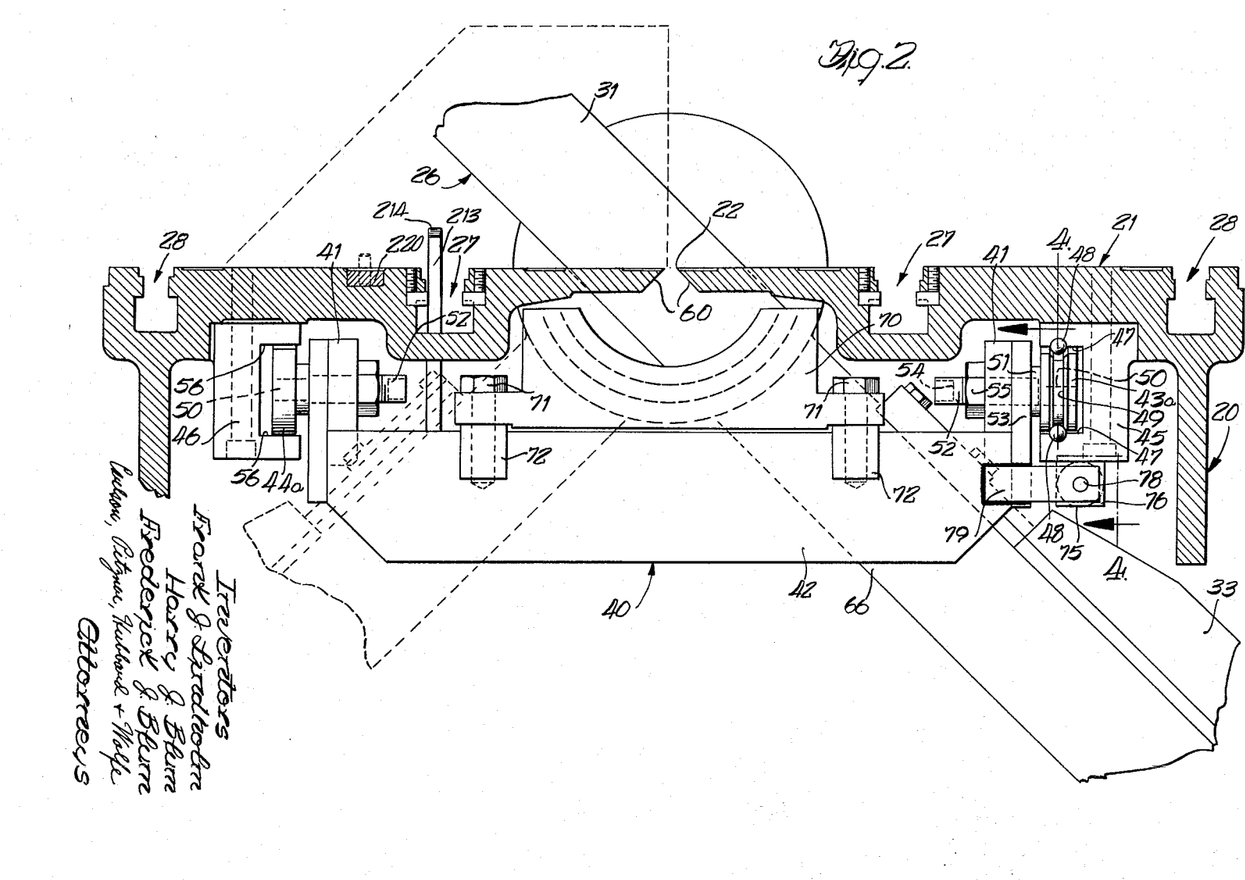
Fig. 2 is a fragmentary transverse sectional view taken through the center portion of the saw table and looking along the line 2—2 in Fig. 3.
Figure 3:
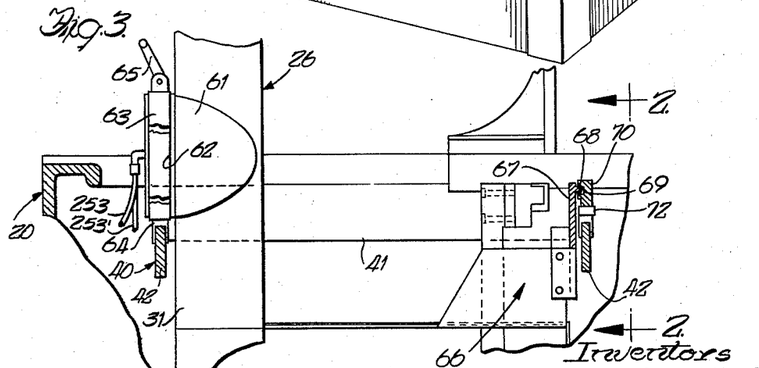
Fig. 3 (Sheet 1) is a fragmentary sectional view taken longitudinally of the base showing the swivel mounting for the saw supporting column.
Figure 4:
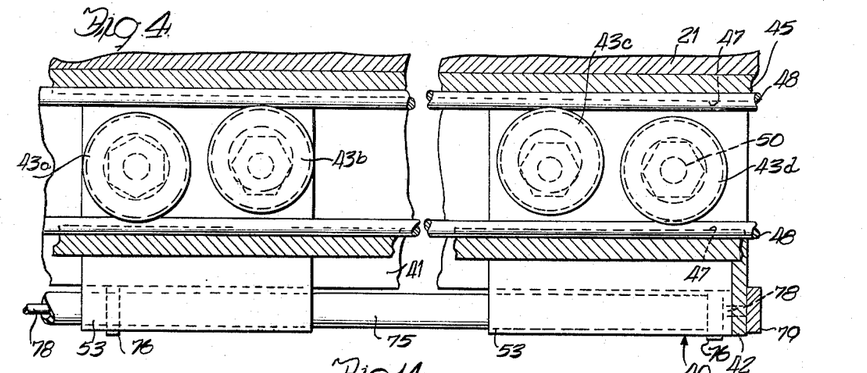
Fig. 4 is a fragmentary sectional view taken in a plane substantially on the line 4—4 of Fig. 2 showing details of the carriage supporting and guiding structure.

Referring more in detail to Figs. 2, 3 and 4 of the drawings, the column supporting and guiding means in its preferred form includes a carriage 40 herein shown as fabricated from heavy metal side plates 41 and end plates 42 welded together to form a rigid rectangular structure. Support for the carriage is provided by wheels or rollers 43a–d and 44a–d mounted on opposite side plates 41 and positioned to cooperate with guide rails 45 and 46 provided on the base 20.

In the exemplary machine, the guide rail 45 and cooperating rollers 42 are constructed and arranged to constrain the carriage against both lateral and vertical movements while permitting smooth, easy longitudinal reciprocation. To this end the guide rail 45 which comprises an elongated rigid structural member bolted or otherwise secured to the underside of the table 21 is formed with a slot in its inner side defining opposed vertically spaced guideways 47. Each guideway is grooved longitudinally to provide a seat for a guide bar 48 which is preferably circular in close section. The guide bars, of course, are rigidly secured in place by screws or other suitable fasteners.

For cooperation with the guide bars 48, the rollers 43 are formed with peripheral grooves 49 having their edges beveled as shown in Fig. 2 to define opposed bearing surfaces spaced apart to straddle the guide bar and engage oppositely sloping surfaces thereon.

In the exemplary embodiment four rollers are provided at each side of the carriage 40. Two of these rollers 43a and 43b are mounted adjacent the front end of the carriage and the other two 43c and 43d are adjacent the rear end as shown in Fig. 4. The rollers 43b and 43c are mounted on an eccentric pin or stud 50 projecting from a head 51 at one end of a bolt 57 with its axis offset laterally from the axis of the bolt. The bolt 52 is received in alined apertures in the side plate 41 and in a mounting plate or pad 53 mounted on and secured to the outer face of the side plate to provide a relatively long bearing for the bolt. The inner end of the bolt is shaped or formed with a socket 54 for cooperation with a wrench or other tool by which the bolt may be rotated. Upon such rotation, the roller is shifted vertically relative to the carriage. A nut 55 threaded on the bolt cooperates with the head 51 to securely lock the bolt in any adjusted position.

In practice one of the rollers of each pair rides in engagement with the lower guideway 47 while the other roller of the pair is shifted into engagement with the upper guideway. When so positioned the rollers effectively restrain the carriage against any movement either vertically or horizontally transversely of the guideways. At the same time the rollers move easily along the guideways and insure smooth, vibrationless movement of the column supporting carriage.

A generally similar supporting and guiding arrangement is provided at the other side of the carriage 40. In this case, however, the rollers 44 are formed with flat peripheral surfaces and the guide rail 46, which is bolted to the underside of the table 21, is slotted to define opposed vertically spaced flat way surfaces 56 for engagement by the rollers. As described above, four rollers 44a—44d are provided on this side of the carriage, two adjacent each end, the rollers 44b and 44c being mounted on eccentric studs 50 projecting from the bolts 52. Here also the rollers are adjusted so that one of each pair runs on the lower way surface 56 while the companion roller rides on the upper way surface. The rollers thus operate to restrain their side of the carriage against transverse vertical movement yet permit smooth easy reciprocation of the carriage.

The improved roller supporting arrangement above described in addition to affording the rigid support required for precise cutting also materially simplifies construction and assembly of the band saw. Thus, the only critical dimensions encountered in manufacture are those involved in locating the guide bars 48 in proper vertical and horizontal alinement. This is relatively easy since the bars are fitted in grooves in the same guide rail 45. Considerable variation in the lateral spacing of the guide rails, as well as in the spacing of the rollers, can be tolerated since the rollers 44 simply ride on flat way surfaces. The same considerations apply to the vertical spacing of the way surfaces 56 and the guide bars 48 since compensation is readily made by appropriate vertical adjustment of the rollers.

To provide for cutting at different angles, the column 26 is mounted on the carriage 40 so that it can pivot about a fore-and-aft axis coincident with the slot 22 and the upper face of the work table 21. As shown in Fig. 2, the lower face of the table adjacent the slot 22 is beveled as at 60 to afford clearance for the saw blade with the column rocked approximately 45° to either side of a vertical position.

Referring to Figs. 1–3 of the drawings, the column mounting means in its preferred form includes a support member 61 welded or otherwise secured to the frame member 31 intermediate its ends and having a circular portion projecting rearwardly of the member. This projecting portion is grooved to define a cylindrical bearing 62 having its central axis located as above explained. The bearing 62 is received in a split bearing ring 63 supported on the end member 42 at the rear of the carriage 40 and secured thereto as by bolts threaded into lugs 64 welded or otherwise secured to the carriage member. A hand lever 65 acting through a screw or cam is provided for drawing the ends of the bar 63 together to frictionally clamp the column in any adjusted position.

At the forward end of the carriage, the column is supported by an upward extension 66 of the lower wheel housing 33. A fitting 67 bolted or otherwise secured to the upper end of the extension is formed with a forwardly projecting arcuate rib 68 adapted to ride in a complemental arcuate groove 69 formed in a support member 70 mounted on the carriage as shown in Fig. 2. The support member in this instance is secured to the carriage front member 42 by screws 71 threaded into lugs 72 formed on or welded to the carriage member. The support thus provided at both the front and rear of the column insures accurate running of the saw blade at all times and prevents undesirable blade deflection under heavy loads.

Due to the effective guiding and supporting action of the structure above described, the carriage 40 and column 26 supported by it can be fed to and from the work by simple feed mechanism located at one side of the carriage. In other words, there is no need to accurately center the feed mechanism with the carriage or to provide duplicate mechanisms acting on opposite sides of the carriage. For smooth action together with a wide range of feeding speeds it is preferred to employ hydraulically actuated feed mechanism and such mechanism has been shown in the exemplary band saw. This mechanism in its preferred form includes an elongated cylinder 75 supported in bracket 76 bolted or otherwise secured to the lower face of the guide rail 45 as shown in Figs. 2 and 4. The cylinder, of course, is disposed parallel to the reciprocatory path of the carriage and its working piston 77 (Fig. 16) is connected by a piston rod 78 and coupling plate 79 (Figs. 2 and 4) with the carriage 40 adjacent its forward end. Fluid under pressure is supplied to the cylinder from a pump P (Fig. 16) under control of valving to be described hereinafter.

Upper band wheel support

Figure 5:
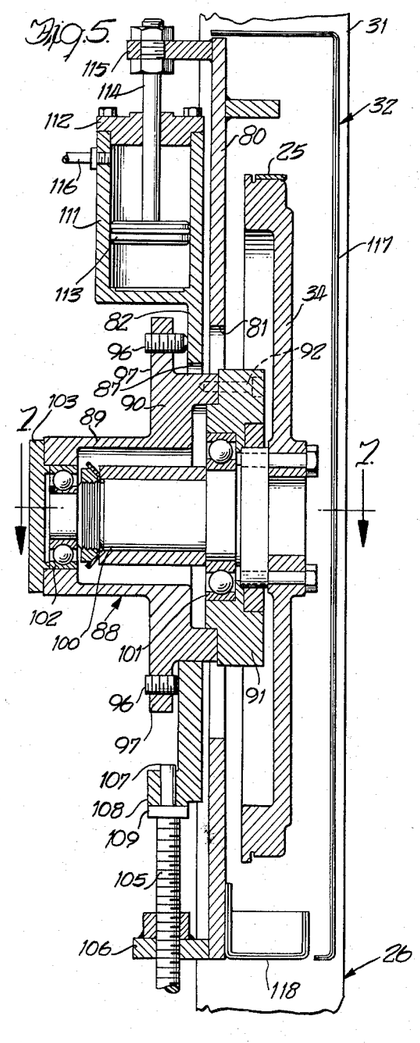
Fig. 5 is a sectional view through the upper end of the blade supporting column taken in a vertical plane substantially on the line 5—5 of Fig. 1.
Figure 7:
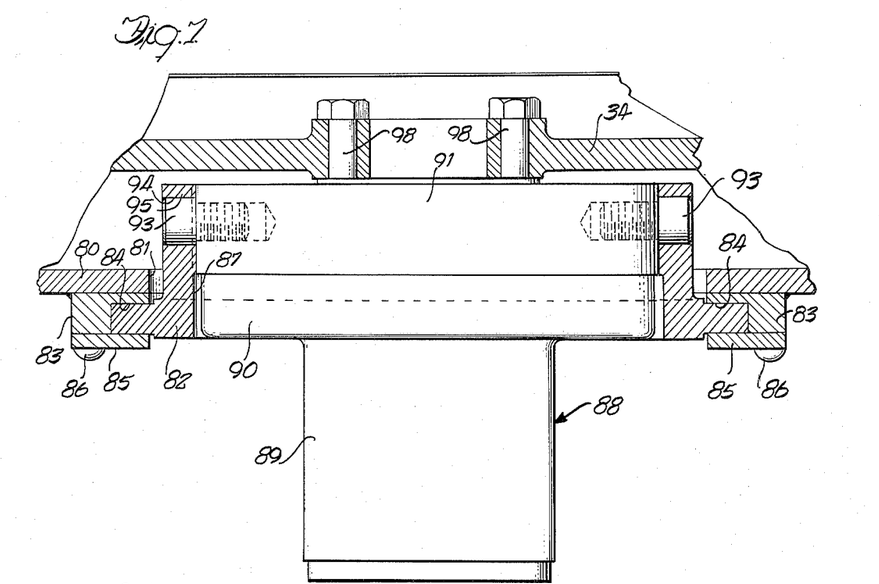
Fig. 7 is a fragmentary sectional view through the upper end of the blade supporting column taken in a horizontal plane substantially on the line 7—7 of Fig. 5.

The saw carrying column 26 and more particularly the upper and lower wheel housings, embody novel features of construction for supporting the band wheels 34 and 35 to provide adjustment for proper tracking of the saw blade. Referring to Figs. 1, 5 and 7, the upper wheel housing 32 comprises a heavy metal plate or casting 80 welded or otherwise rigidly secured to one side of the frame member 31 and projecting forwardly therefrom. The plate is apertured as at 81 and over this aperture is mounted a slide 82. As will be seen by reference to Fig. 1, the slide 82 is generally rectangular and its opposite side edges are slidably received in parallel vertical guides provided on the plate 80. As shown in Fig. 7, the guides are defined by a pair of guide bars 83 welded to the outer face of the plate 80, each bar having its inner edge rabbeted as at 84 to receive the edge of the slide. Retainer strips 85 removably secured to the guide bars 83 as by screws 86 retain the slide in place while permitting edgewise sliding movement in a vertical plane.

The slide 82 is formed with a central opening as at 87 and within this opening a bearing housing 88 is mounted for limited swiveling movement about a horizontal axis located in a plane parallel to the reciprocatory path of the column. As shown in Figs. 2 and 7, the bearing housing 88 includes a hollow sleeve portion 89 terminating in an enlarged cylindrical portion 90 counterbored to receive the reduced end of an annular end member 91 secured in place as by screws 92. Studs 93 (Fig. 7) projecting from opposite sides of the annular member engage in sockets 94 formed in lugs 95 integral with and projecting rearwardly from the slide 82 at opposite sides of the opening 87. Angular positioning of the bearing housing is effected by means of set screws 96 threaded through lugs 97 projecting from the upper and lower sides of the housing portion 90. As shown in Fig. 5 the set screws bear against the adjacent face of the slide.

The band wheel 34 is mounted at one end of a shaft 100 as by screws or other suitable fastening elements. Shaft 100 is rotatably supported in the bearing housing 88 preferably by anti-friction bearings. In the exemplary embodiment, support for the shaft is provided by two anti-friction bearings 101 and 102. Bearing 101 is fitted on an enlarged portion of the shaft adjacent the wheel and is seated in a recess form in the end member 91. Bearing 102 is fitted on the opposite end of the shaft which is reduced in diameter and is received in a bearing seat formed in the outer end of the sleeve 89. A removable cap 103 closes the end of the sleeve and provides access to the bearings for greasing.

When the saw is not in use or when a blade is to be installed or replaced, the upper band wheel 34 is shifted downwardly or toward the lower band wheel by appropriate movement of the slide 82. Adjustable stop means is provided for limiting such downward movement of the slide. As shown in Fig. 5 the stop means includes an adjustable stop screw 105 threaded through a lug 106 rigid with and projecting laterally from the housing plate 80. The screw, of course, is disposed parallel to the path of movement of the slide and its upper end is formed with an elongated, smooth tip 107 slidably received in a guide socket formed in a lug 108 adjacent the lower end of the slide. An integral collar 109 on the screw cooperates with the lower face of the lug to limit downward movement of the slide. The limit position may be readily adjusted by screwing the stop up or down.

When the saw is in operation considerable tension must be maintained on the saw blade 25 to insure efficient and accurate cutting. The invention provides novel power actuated means for maintaining the proper tension on the blade at all times. As herein shown, the tensioning means comprises a vertically disposed cylinder 111 integral with or rigidly secured to the slide 82 and having its upper end closed by a removable cylinder head 112. The cylinder is fitted with a piston 113 having a piston rod 114 extending through the head 112 and anchored to a lug 115 projecting laterally from the housing plate 80 adjacent its upper end.

Fluid under pressure supplied to the upper end of the cylinder 111 by way of a conduit 116 urges the cylinder and slide 82 upwardly and thus applies tension to the saw blade running over the band wheels 34 and 35. By appropriate regulation of the pressure of the fluid supplied to the cylinder, as described in detail hereinafter, the tension on the blade may be varied as desired.

A sheet metal cover 117 completes the wheel housing 32 and completely encloses the band wheel 34 for safe operation. The cover is hinged, preferably at its rear edge, so that it can be swung open to provide access to the wheel for changing blades. A traylike bottom member 118 closes the bottom of the housing and serves to catch any particles of metal dislodged from the blade as it passes over the wheel. It will be understood that the member 118 is dimensioned to afford clearance for the blade at the front and back of the wheel housing.

Lower band wheel support

The wheel housing 33 for the lower band wheel 35 also comprises a heavy metal plate or casting 120 secured at its rear edge to the frame member 31 and extending forwardly in a plane parallel to the reciprocatory path of the column. The plate is formed with an opening 121 for the accommodation of a bearing and drive housing 122 which is mounted for limited pivotal movement about a horizontal axis parallel to the plane of the plate.

Figure 6:
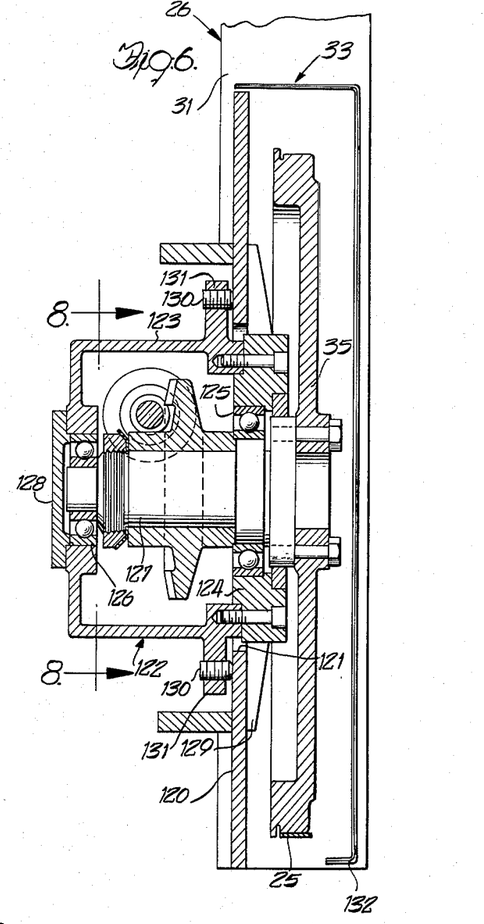
Fig. 6 is a vertical sectional view through the lower end of the blade supporting column.
Figure 8:
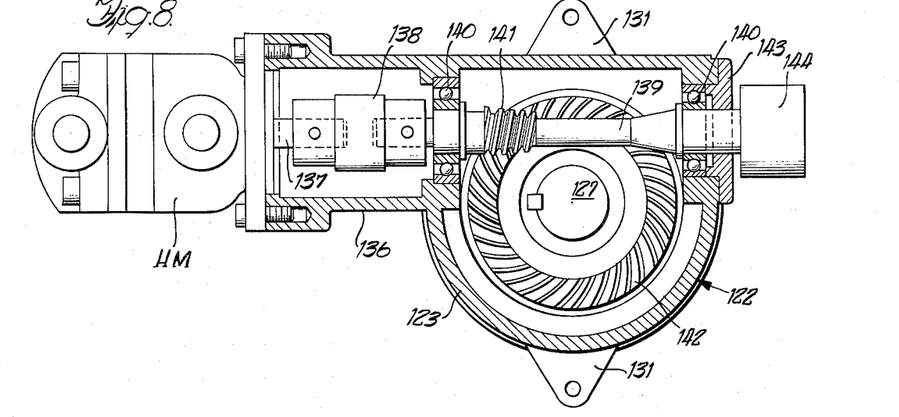
Fig. 8 is a fragmentary sectional view of the lower band wheel drive taken in a plane substantially on the line 8—8 of Fig. 6.

The housing 122 as shown in Figs. 6 and 8 comprises a hollow cylindrical body 123 having an annular end member 124 removably secured at its inner end. Anti-friction bearings 125 and 126 fitted in bearing seats formed in the end member 124 and in the opposite end wall of the body rotatably support a shaft 127. The band wheel 35 is rigidly secured to the inner end of this shaft by screws or other suitable connecting means as shown in Fig. 6. A removable cap 128 closes the outer end of the body 123 and affords access to the interior of the housing for greasing or other services.

Pivotal support for the housing 122 is provided by studs (not shown) similar to the studs 93 projecting from opposite sides of the end member 124 and engaging in sockets formed in laterally projecting ribs 129 extending vertically along the inner face of the plate 120. Set screws 130 threaded through lugs 131 projecting from the upper and lower sides of the body 123 cooperate with the outer face of the plate 120 to determine the angular position of the housing and thus provide for adjusting the lower band wheel to insure proper tracking of the saw blade. A sheet metal cover 132 encloses the band wheel, the cover being hinged along one edge to swing out for convenience in replacing the blade.

Band wheel drive

The novel drive providing for the lower band wheel 35 materially simplifies the construction of the band saw and affords a wide, readily controllable range of driving speed. It is preferred to utilize a rotary hydraulic motor HM for driving the band wheel and, to obtain the advantages above mentioned, the motor is mounted directly on the bearing housing 122. This motor is supplied with fluid under pressure by a pump P1 (Fig. 16) under control of valving to be described later on. As shown in Fig. 8, the motor HM is mounted at one end of a tubular extension 136 formed at one side of the housing body 123. The motor shaft 137 projects into this extension and is connected by a coupling 138 with one end of a drive shaft 139 journalled in anti-friction bearings 140 fitted in bearing seats formed in the body 122 at opposite sides of the wheel shaft 127.

While any suitable gearing may be utilized to drivingly connect the shaft 139 with the wheel shaft 127, to minimize weight and economize in space, it is preferred to employ the so-called Spiroid gearing. With this type of gearing the shaft 139 can be mounted relatively close to the shaft 127 with a pinion 141 on the drive shaft meshing with a gear 142 keyed to the shaft 127 within the housing body 123. To insure smooth operation the shaft 139 may, if desired, be extended through a cover plate 143 on the housing to carry a heavy balance wheel 144. If the balance wheel is not wanted, the shaft 139 is terminated adjacent the outer bearing 140 and an imperforate cover plate is substituted for the cover plate 143.

*Work clamping mechanism*

Figure 9:
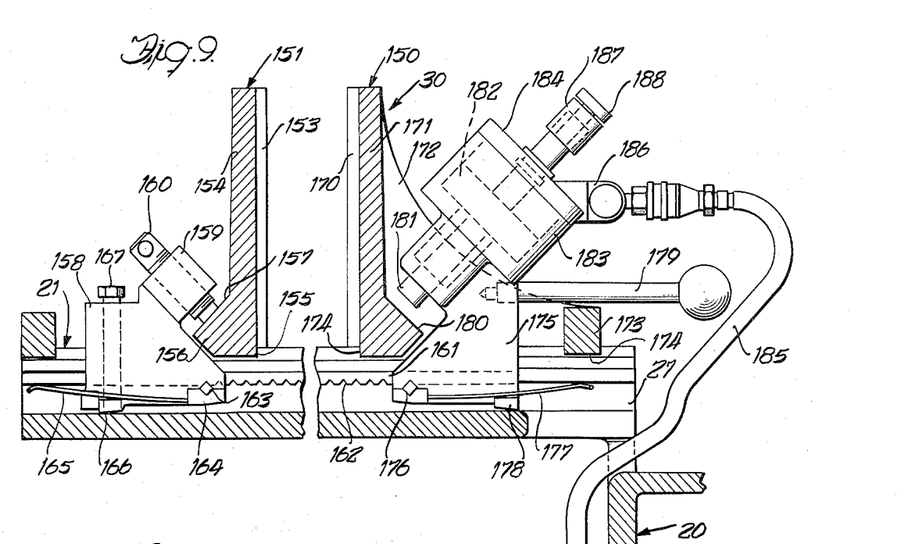
Fig. 9 is a longitudinal sectional view taken through the forward portion of the base and the work clamping mechanism mounted thereon.
Figure 10:
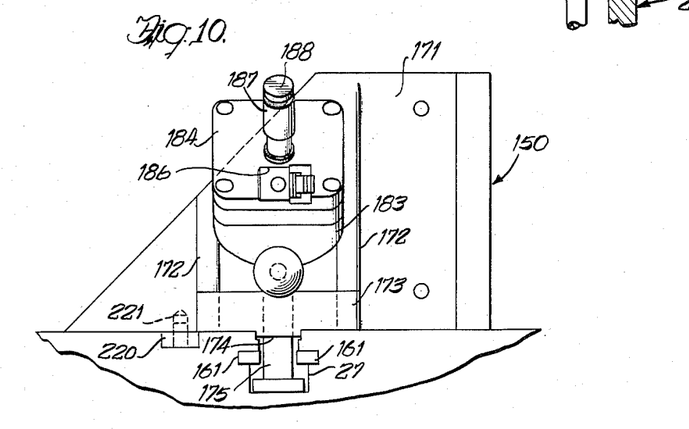
Fig. 10 is a front elevational view of the clamping mechanism.

The work clamping mechanism 30 is characterized by its ease of adjustment for holding workpieces of different sizes and further by its ability to clamp and hold tubular workpieces securely without crushing or objectionably deforming them. In its preferred form as shown in Figs. 1, 9 and 10, the clamping mechanism includes front and rear work engaging jaws 150 and 151 slidably mounted in one of the pair of T-slots 27 in the work table 21 for independent adjustment toward or from the front end of the table. The T-slots 27 are located at opposite sides of the saw slot 22 in the table and the clamping mechanism is interchangeable between the slots to permit positioning at either side of the saw blade as required by the particular workpieces to be sawed.

The rear clamping jaw 151 is the fixed jaw of the mechanism although it is adjustable as a preliminary step to any selected position dictated by the character of the workpiece. As herein shown, this jaw comprises a wear plate 153 having one end of rectangular configuration and the other end cut off at an angle or beveled, as shown in Fig. 1, to accommorate operation of the saw blade in a tilted position. The wear plate 153 is removably secured to a rigid support member 154 which has a rib 155 extending from it slower face and dimensioned to slide in the T-slot 27. Adjacent its lower edge the support member has a rearward enlargement or projection 156 defining an inclined clamping surface 157.

Cooperating with the support member 154 is an abutment member 158 having its lower end shaped to ride in the T-slot 27. The upper end of this member which projects above the surface of the table 21 has an extension 159 positioned to overlie the clamping surface 157 of the support member and threaded for the reception of a clamp screw 160 adapted to clampingly engage that surface. It will be observed that the clamping screw is disposed perpendicular to the surface 157 so that the pressure exerted by the screw tends to force the support member both forwardly and downwardly against the top of the table 21.

Provision is made for securely locking the abutment member 158 in any of a series of adjusted positions so that it may retain the jaw 151 in a fixed position for clamping a workpiece. For this purpose the wide portion of the T-slot 27 is fitted with a pair of hardened locking bars 161 (Fig. 10) located on opposite sides of the narrow upwardly opening portion of the slot. Each of the bars is formed with laterally alined downwardly facing notches 162 as shown in Fig. 9. Adjacent its forward end the abutment member 158 carries a notch engaging bar 163 held in place by a support element 164.

Adjacent its rear end the abutment member is formed with an inclined heel 166 adapted to ride on the bottom of the T-slot while permitting limited forward rocking of the member against the force exerted by a spring 165.

In such forward rocking, the bar 163 is withdrawn from the notches so that the entire jaw assembly can be pushed along the T-slot to a selected position. When released, the spring immediately rocks the support member in the opposite direction to engage the bar 163 in the notches. The abutment member may then be rigidly locked in place by means of a locking screw 167.

With the abutment member locked in an adjusted position, the support member may be positioned on the table by screwing down the clamp screw 160. It will be evident that with the construction shown, shifting of the rear jaw assembly under pressure of the work is effectively prevented whether or not the abutment locking screw is secured down. Pressure of the work against the rear jaw tends to rock the abutment member rearwardly and thus holds the bar 163 securely in the notches 162.

The construction of the front jaw 150 is generally similar to that of the rear jaw above described. Thus, the front jaw includes a wear plate 170 mounted on the face of an upright support member 171 which has a pair of laterally spaced triangular braces 172 extending forwardly and connected at their front ends by a cross member 173. The support member and the cross member are formed with depending guide ribs 174 adapted to ride in the narrow portion of the T-slot 27.

Disposed between the braces 172 is a front abutment member 175 having its lower end shaped to ride in the wide portion of the T-slot and carrying at its lower rear end a locking bar 176 adapted to engage in the notches 162. The locking bar is urged into engagement with the notches by a spring 177 which tends to rock the abutment member about an inclined heel 178 formed on its forward end and engageable with the bottom of the T-slot. A forwardly projecting handle 179 is provided for convenient tilting of the abutment member to release it for adjusting movement to accommodate a particular workpiece. As shown in Fig. 9 the support member 171 of the front jaw 150 is formed in its lower edge with an extension defining an inclined clamping surface 180. The companion abutment member 175 carries a movable clamp element adapted to engage the surface 180 and thus shift the front jaw rearwardly and at the same time clamp it against the face of the table 21. The clamp element in its preferred form comprises a piston rod 181 fixed to a piston 182 working in a cylinder 183 formed on or secured to the abutment member 175. The upper end of this cylinder is closed by a removable head 184 suitably ported for connection of a flexible conduit 185 through which pressure fluid is supplied to the cylinder to advance the piston and rod to clamping position. A spring 181' (Fig. 16) returns the piston and rod to retracted position and releases the workpiece when the cylinder is vented. Preferably the conduit connection is effected through the medium of a swivel fitting 186 to avoid undesired kinking or bending of the flexible conduit.

It will be evident that piston 181 upon engaging the surface 180 will urge the front jaw toward the rear jaw and thus apply clamping pressure to a workpiece placed between the jaws. To avoid crushing or distorting a tubular workpiece, means is provided for limiting the movement of the piston rod in a clamping direction. For this purpose the piston rod is extended at the other end of the piston 182 so as to project through a suitable gland in the cylinder head 184. Fitted on the projecting end of the piston rod is a stop collar 187 adjustable longitudinally of the rod by a headed adjusting screw 188 threaded into the end of the rod. Upon movement of the piston 182 in a clamping stroke, collar 187 cooperates with the head 184 to determine the length of the stroke and thus limit the extent to which the front jaw 150 may be forced into a yieldable workpiece such as a piece of tubing. By appropriate adjustment of the screw 188 the clamping action can be regulated to apply sufficient pressure to hold the workpiece securely without crushing or objectionably deforming it.

Feed control mechanism

Figure 11:
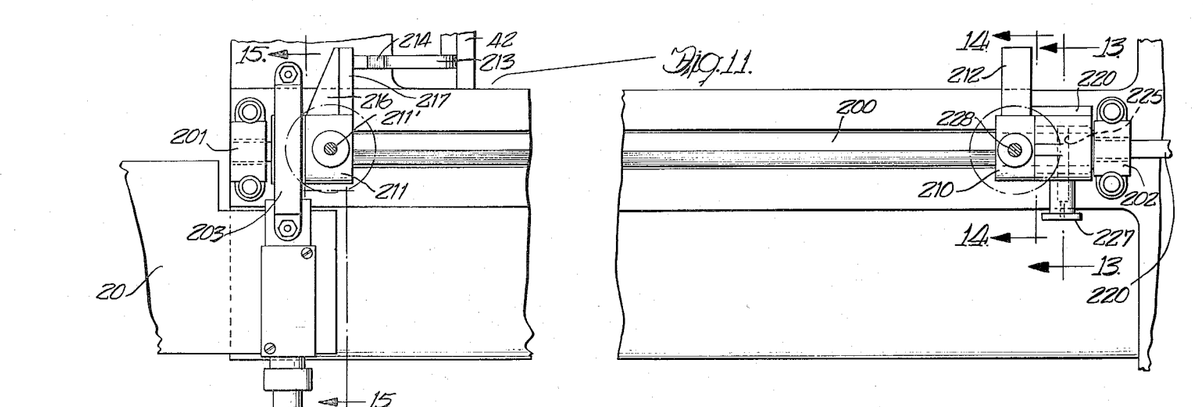
Fig. 11 is a fragmentary top view of the base showing details of the control rod assembly.
Figure 12:
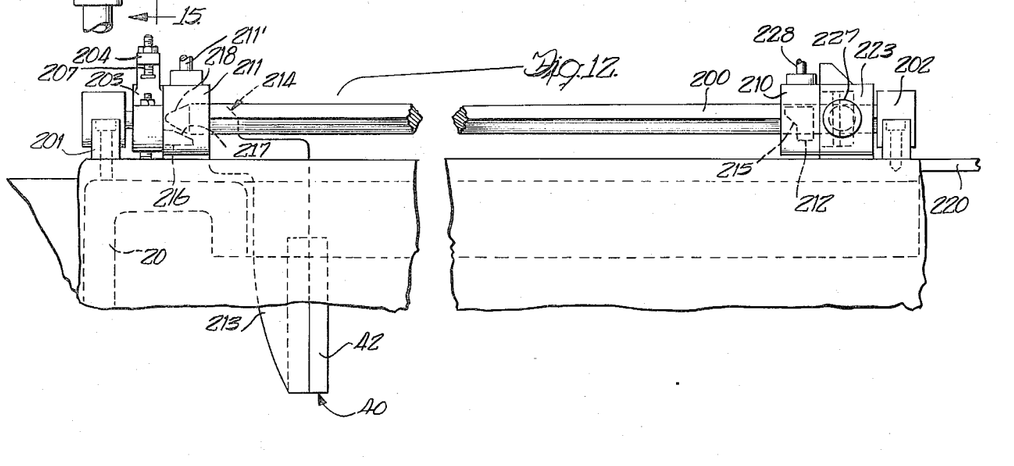
Fig. 12 is a side elevational view of the control rod assembly shown in Fig. 11.

Before entering into a detailed description of the control system and its operation generally, it will be helpful to consider first the novel structure through which the column supporting carriage 40 acts to interrupt the feed of the saw blade upon completion of a cut. Referring more particularly to Figs. 11–15 of the drawings, the control structure includes a control rod 200 supported on the base 20 to the rear of the table 21 and disposed parallel to the path of reciprocation of the carriage. As shown in Figs. 11 and 12 the control rod is rotatably supported at opposite ends in a pair of pillow blocks 201 and 202 bolted or otherwise attached to the upper face of the base 20.

Figures 13, 14, 15:
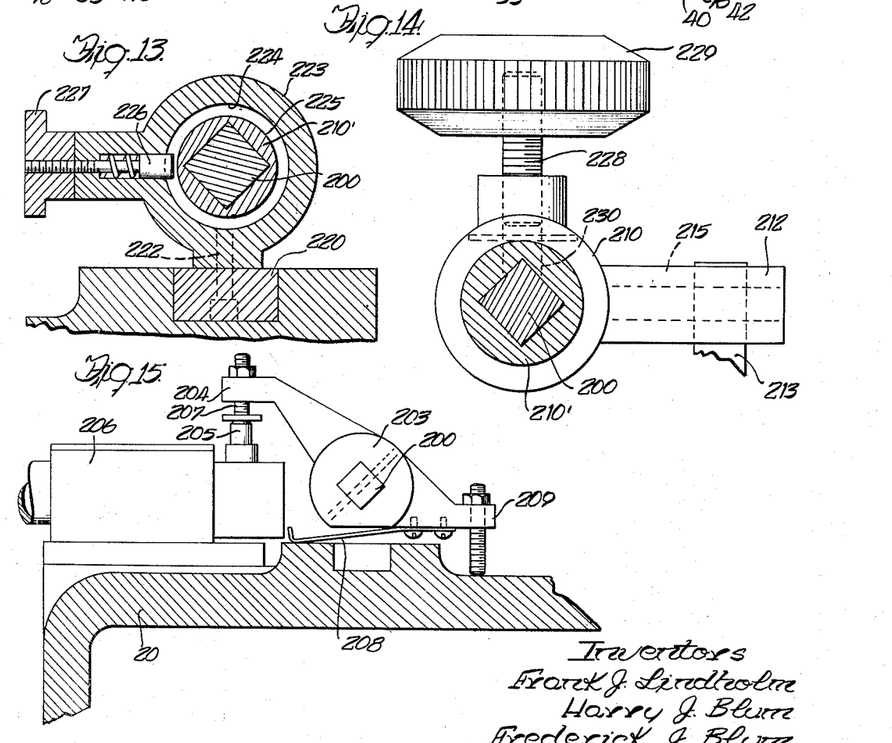
Fig. 13 (Sheet 5) is a fragmentary sectional view taken in a plane substantially on the line 13—13 of Fig. 11.
Fig. 14 is a fragmentary sectional view taken in a plane substantially on the line 14—14 of Fig. 11.
Fig. 15 is a fragmentary sectional view taken in a plane substantially on the line 15—15 of Fig. 11.
Figure 15:
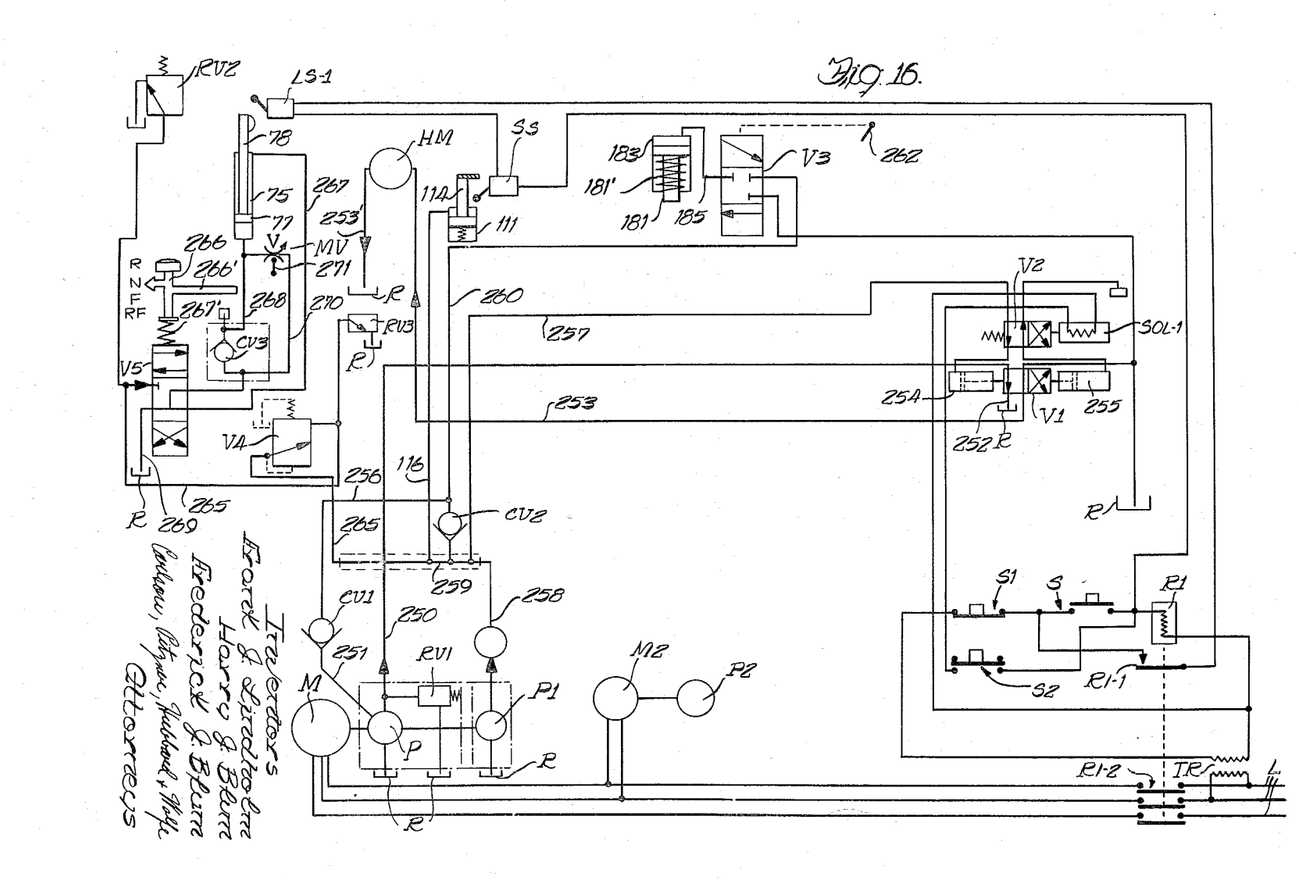

Nonrotatably mounted adjacent one end of the rod, in this instance, the rear end, is a collar 203 (Figs. 11, 12 and 15) having a switch actuating arm 204 projecting laterally to overlie the operating plunger 205 of a limit switch LS1 enclosed in a casing 206. The arm carries an adjustable contact element in the form of a screw 207 positioned to engage and depress the plunger 205 when the control rod is rocked anticlockwise from the normal position in which it is shown in Fig. 15. A leaf spring 208 secured to a stop arm 209 projecting from the collar engages the machine base to yieldably bias the control rod toward a normal position. Such position is defined by an adjustable stop screw threaded through the arm 209 to engage the base 20 as shown.

Mounted on the control rod 200 for sliding adjustment longitudinally of the rod are front and rear stop members 210 and 211. The stop members may be constrained to rock with the control rod as a unit in any preferred manner. Thus, the members may be keyed or splined to the control rod, although for simplicity of construction it is preferred to utilize a rod of substantially square cross section and to form the stops with complementally shaped openings as shown.

Referring to Figs. 11 and 12, the front stop 210 has a finger 212 projecting inwardly toward the open center of the base 20 for engagement by a dog 213 secured to and reciprocable with the carriage 40. As shown in Fig. 12 the dog extends forwardly above the surface of the base 20 and has an inclined camming face 214 adapted to engage a similar inclined face 215 on the arm 212. Upon such engagement, the control rod 200 is rocked anticlockwise as viewed in Fig. 15.

The stop member 211 also has a radially projecting stop finger 216 (Fig. 11) positioned for engagement with the rear surface of the dog 213. Stop member 211 is provided with a manually operated clamping screw 211' by which it may be securely locked in any selected position along the rod. Such adjustment defines the limit position to which the carriage 40 is retracted by the power actuator associated with the carriage.

In accordance with another aspect of the invention means is provided for automatically adjusting the front stop 210 so that the feed of the saw will automatically stop as soon as a workpiece has been cut through. As the remote edge of the work is determined by the position of the movable clamping jaw 150, this is conveniently done by providing a connection between the movable clamping jaw and the front stop member so that they move as a unit. Such connection may conveniently take the place of elongated flat bar 220 (Figs. 10-13) slidable in a longitudinal slot in the upper face of the base 20. As shown in Fig. 10 the bar extends below the front jaw 150 and is secured to it by means of a dowel pin 221. Accordingly, movement of the jaw to clamp a workpiece in place imparts a corresponding movement to the bar 220.

At its other end, the bar 220 extends below and is connected as by screws 222 to a collar 223 slidably mounted on the control rod 200 adjacent the stop 210 as shown in Figs. 11 and 13. The stop 210 is formed with a neck portion 210' of reduced diameter dimensioned to telescope into a socket 224 formed in the collar. As shown in Fig. 13 the neck 210 is peripherally grooved as at 225 to receive a spring urged pin 226 slidably mounted in a cross bore in the collar 223. When the pin 226 is engaged in the groove 225, the front stop 210 is locked to the collar 223 and is thus shifted forwardly or rearwardly in accordance with the positioning of the movable clamping jaw 150.

Independent setting of the front stop 210 may be desirable at times as when a workpiece is to be slotted instead of sawed through. To effect such independent setting it is only necessary to withdraw the pin 226 by means of the finger knob 227, thus freeing the stop so that it can be shifted along the control rod to a position marking the depth of the slot. A clamping screw 228 operable by a knob 229 and acting through a friction clamping member 230 serves to lock the stop member in the adjusted position.

Operating and control system

The mode of operation of the improved band saw can be most easily described and understood by reference to the hydraulic and electrical circuit diagram (Fig. 16). As explained heretofore the hydraulic actuator 75, 77 for feeding and retracting the column supporting carriage is mounted on the base 20 alongside the carriage track while the hydraulic motor HM for driving the saw blade is supported on the lower wheel head. The pumps P and P1 supplying pressure fluid to the actuator and motor, together with the associated auxiliary apparatus, control valves and fluid reservoir or sump R are housed in a compartment 245 within the rear portion of the base. The electrical elements are preferably enclosed in a metal control box 246 supported on the base adjacent the compartment 245 as shown in Fig. 1. For convenience of control the manually operable electrical switches and valve actuating levers are mounted on a control panel 247 provided at the front end of the base.

Referring to the circuit diagram (Fig. 16) the band saw is placed in operating condition by momentary closure of a push-button starting switch S. Closure of this switch completes an energizing circuit for a relay R1. This circuit receives current through a transformer TR bridged across two of the three conductors of the line L supplying power to the saw. Relay R1, upon energizing, completes a holding circuit by closing switch contacts R1–1. This holding circuit includes a normally closed stop switch S1, feed interrupting limit switch LS-1, and a safety switch SS which is normally closed but which opens upon breakage of the saw blade. The start and stop switches S and S1 are preferably mounted on the control panel 247 as shown in Fig. 1 where they are conveniently accessible to the operator.

Relay R1 when energized also closes the main motor switch R1-2 supplying electric current to a motor M, which, in this instance, drives both pumps P and P1. Closure of the switch R1-2 also supplies current to a motor M2 which drives a pump P2 supplying liquid coolant to the working portion of the saw blade.

In the exemplary band saw, the pump P is of the dual delivery type adapted to deliver fluid under pressure through conduits 250 and 251. Conduit 250 extends to a reversing valve V1 operative in one position to divert the pressure fluid to the sump by way of a conduit 252. In its alternate position valve V1 directs pressure fluid by way of the conduit 253 to the hydraulic motor HM to drive the saw blade.

Conduit 253, together with the discharge conduit 253' which carries spent fluid from the motor to the sump are connected to the motor through suitable swivel fittings provided in the column support 61 to accommodate the pivotal adjustments of the column. With the arrangement shown, the saw blade drive may be started and stopped by appropriate positioning of the valve V1. A relief valve RV1 protects this portion of the fluid supply system from excessive pressure.

Positioning of the valve V1 is effected in the present instance by hydraulic actuators 254 and 255 supplied with pressure fluid under control of a pilot valve V2. Pilot pressure is supplied by the pump P1 through the pilot conduit 257. The pilot valve is spring biased to the position shown in Fig. 16 in which it directs fluid to the actuator 254. This positions the valve for stopping the saw blade drive. At this time actuator 255 is vented to the sump to permit shifting of the movable valve member by the actuator 254.

In its alternate position, valve V2 directs pilot pressure fluid to the actuator 255 while venting actuator 254. Valve V1 is accordingly shifted to a position to direct pressure fluid from the pump P to the motor HM thus causing the saw blade to be driven.

Shifting of the pilot valve V2 to its alternate position is effected by a solenoid SOL-1 energized by the closure of a locking type manually operable switch S2. The circuit for the solenoid includes the limit switch LS-1, the safety switch SS and the stop switch S1. The drive for the saw blade can therefore be interrupted at any time desired by release of the switch S2 or by actuation of the stop switch S1 and it is automatically interrupted at the end of a feed stroke or upon breakage of the blade by opening of the switch LS-1 or SS.

The pump P1 delivers fluid under pressure by way of a conduit 258 to a manifold 259 from which the pilot fluid conduit 257 branches. Another conduit 260 branching from the manifold and having an interposed check valve CV2 extends to a clamp control valve V3. Valve V3 is a three-position valve and in the position shown in Fig. 16 it locks the fluid in the clamp cylinder 183 to maintain the work securely clamped in place. Upon movement to the operating position (upwardly, as viewed in the drawing), valve V3 directs pressure fluid through the flexible conduit 185 to the clamp cylinder to set the clamp. When operated to release position (downwardly, as viewed in the drawing), the valve vents cylinder 183 to the sump and releases the clamp from the work.

Provision is made for automatically increasing the clamping pressure on the work when the saw blade is heavily loaded. For this purpose, the second discharge conduit 251 from the pump P is connected through a check valve CV1 and branch conductor 256 with the conduit 260 through which pressure fluid is supplied to the blade driving motor HM. Accordingly, as the pressure of the fluid delivered by the pump P rises with an increased load on the saw blade, the pressure of the fluid supplied to the clamping cylinder 183 is correspondingly increased.

While the clamp controlling valve V3 may be actuated in any preferred manner, the valve of the exemplary band saw is provided with a manual shift lever 262. As shown in Fig. 1 the lever 262 is mounted on the control panel 247 at the front of the saw where it is readily accessible to the operator when setting up a workpiece for sawing.

Another conduit 116 branching from the manifold 259 supplies fluid to the blade tensioning cylinder 111 previously described. As shown in Fig. 16, the safety switch SS is supported for actuation by the cylinder 111 or by the slide 82 with which the cylinder is associated when the slide is shifted beyond its normal range as upon breakage of the saw blade 25.

Pressure fluid for feeding the saw to and retracting it from the work is supplied by the pump P1 by way of a conduit 265 branching from the manifold 259 and extending by way of a sequence valve V4 to a feed control valve V5. The sequence valve is adjusted so as to remain closed and delay fluid flow to the feed cylinder until the work clamping and blade tensioning actuators have completed their operation as evidenced by the build-up of pressure in the conduit 265.

The feed control valve V5 of the exemplary band saw is arranged for manual operation between four positions, including a neutral position "N" in which it is shown in Fig. 16, a feed position "F," a rapid approach position "RF" and a return position "R." Operation of the valve is effected in this instance by an actuator operated by a hand lever 266 conveniently mounted on the control panel 247 at the front of the machine as shown in Fig. 1. For convenience, the lever has been shown in Fig. 16 as having linear movement between the various indicated positions while, as a practical matter, the movement is ordinarily pivotal.

In the return position of the valve V5 in which the movable member of the valve is shifted upwardly from the position shown, conduit 265 is connected by way of a conduit 267 to supply pressure fluid to the rod end of the feed cylinder 75. The other end of the cylinder is vented by way of a conduit 268, check valve CV3, valve V5 and a vent conduit 269 leading to the sump. The carriage 40 and saw supporting column are accordingly returned rapidly to the retracted position.

For effecting rapid advance of the saw carriage, the hand lever 266 is rocked all the way down to its lowest position, thereby shifting the movable member of the valve V5 past the feed position. In this movement, the hand lever, through its extension 266, opens the check valve CV3 to by-pass the metering valve MV and vent the cylinder directly to the sump by way of conduit 268 while connecting the pressure line 265 to the upper or rod end of the cylinder.

To slow the carriage down to the feed rate, it is only necessary to release the hand lever 266 which is returned by the spring 267′ along with the movable valve member to the feed position "F." The supply and exhaust connections to the cylinder 75 remain the same but the check valve CV3 is now closed so that the cylinder must discharge through the metering valve MV. The speed of advance is thus determined by the metering valve which may be set by means of the knob 271 (Fig. 1). The hydraulic feed circuit is protected against development of excessive fluid pressure by a relief valve RV3. The relief pressure is set manually as by a knob 272 on the control panel.

The control system above described materially simplifies the work of the operator in controlling the band saw. Thus, after the workpiece has been placed between the clamping jaws and with the carriage and saw supporting column in retracted position, the saw is started by momentary actuation of the push-button starting switch S. This starts the motor M and the pumps P and P1 operate to supply pressure fluid to the hydraulic system. The operator may now swing the lever 262 to shift the valve V3 to clamping position and the clamping plunger 181 is advanced to clamp the work rigidly for the sawing operation. Starting the pump P1 results in tensioning of the saw blade by the operation of the hydraulic actuator 111, 114. The drive for the saw blade is then started by actuation of the push-button switch S2. This switch operates the pilot valve V2 which in turn sets the control valve V1 to direct pressure fluid to the saw blade driving motor HM.

Advance of the saw is under complete control of the operator through the medium of the hand lever 266. To bring the saw blade into proximity to the workpiece the lever is depressed to its lowermost position setting the valve V5 in rapid advance position. The carriage and blade supporting column are accordingly advanced rapidly and, as the blade approaches the work, the hand lever is eased back, thus shifting the valve to the feed position. Advance of the carriage and blade supporting column then proceeds at a slower rate determined by the setting of the metering valve MV. This rate can be adjusted at any time, of course, by appropriate manipulation of the manual control 271.

As explained heretofore, the controls through which the switch LS-1 is operated are adjusted automatically by the positioning of the front work clamping jaw 150. Accordingly, when the saw finishes the cut in the workpiece clamped in the jaws, switch LS-1 is opened to interrupt the circuit for the relay R1 which immediately becomes deenergized and stops the machine. To return the carriage and blade supporting column to retracted position, it is only necessary to reset the control valve V5 to return position and momentarily actuate the starting switch S. If desired, the controls may be arranged so that the switch LS-1 is again opened as the carriage moves into the fully retracted position.

It will be apparent from the foregoing that the invention provides a heavy duty metal cutting band saw of novel and improved construction. Smooth feeding of the saw blade to the work is insured by the novel mounting of the blade supporting structure. Moreover, this mounting enables the supporting carriage to be driven by a single actuator acting at the side of the carriage without any binding of the carriage on the ways and with a complete absence of chatter and vibration so that even the heaviest workpieces may be cut with a high degree of precision.

The improved saw also includes novel work clamping means interconnected with the controls so that the latter are automatically set to interrupt a sawing operation as soon as the blade breaks through the work. The saw blade is carried on wheels mounted in a novel manner to afford quick and easy adjustment for proper tracking of the blade and the blade is automatically maintained at the proper tension for the particular cutting action being performed.

In general, the improved band saw is simple and rugged in construction, foolproof in operation and all of its operations are subject to instantaneous control from a single control panel located at the front of the machine and readily accessible to the machine operator.

We claim as our invention:

1. In a band saw, in combination, a column having wheel housings at its upper and lower ends, a pair of band wheels each having an individual shaft, a pair of bearing housings each carrying anti-friction bearings rotatably supporting the respective shafts, cooperating means on the respective wheel housings and bearing housings supporting the latter for limited pivoting movement about axes transverse to the axes of the shaft supported in the bearing housings, an endless flexible band saw blade running over said wheels, a tubular extension formed integrally with one of said bearing housings and extending transversely relative to the wheel shaft supported in that housing, a drive shaft journaled in said extension and extending across the wheel shaft, a gear fixed to said wheel shaft, a pinion on said drive shaft meshing with said gear, and a motor mounted on the extension connected to drive said drive shaft.

2. In a band saw, in combination, a saw supporting column, a carriage supporting said column for feeding and retracting movements, clamping means for holding a workpiece to be cut by the saw including fixed and movable jaws engageable with opposite sides of the workpiece, power actuated means for advancing said carriage to feed the saw to the work, control means including a stop dog on said carriage, a stop member positioned to be engaged by said dog in the advance of the carriage and operative when so engaged for interrupting the advance of said carriage, and means operative incident to the movement of said movable clamping jaw into work clamping position for locating said stop member in a position to interrupt the advance of the carriage immediately upon completion of the cut.

3. In a band saw, in combination, a saw supporting column, a carriage supporting said column for feeding and retracting movements, clamping means for holding a workpiece to be cut by the saw including fixed and movable jaws engageable with opposite sides of the workpiece, power actuated means for advancing said carriage to feed the saw to the work, control means including a stop dog on said carriage, a stop member positioned for engagement by said dog in the advance of the carriage and operative upon such engagement for interrupting the advance of said carriage, and a bar connecting said stop member and said movable clamping jaw together for movement as a unit whereby the stop member is automatically positioned to interrupt the advance of the carriage immediately upon completion of the cut through the particular workpiece clamped between the jaws.

4. In a band saw, in combination, a saw supporting column, a carriage supporting said column for feeding and retracting movements, clamping means for holding a workpiece to be cut by the saw including fixed and movable jaws engageable with opposite sides of the workpiece, power actuated means for advancing said carriage to feed the saw to the work, control means including a stop dog on said carriage, a stop member positioned for engagement by said dog in the advance of the carriage and operative upon such engagement for interrupting the advance of said carriage, means connecting said movable jaw to said stop member for movement as a unit whereby the stop member is automatically positioned to interrupt the advance of the carriage upon completion of the cut through the particular workpiece clamped between said jaws, said connecting means being disengageable to permit movement of the stop member to a selected position independently of the movable jaw, and means for locking said stop member in said selected position.

5. In a band saw, in combination, work clamping means including fixed and movable jaws, a pressure fluid operated actuator for shifting said movable jaw to clamp a workpiece for sawing, a column supporting an endless flexible band saw blade in position to cut work held by said clamping means, a pressure fluid operated motor for driving said saw blade, a carriage supporting said column for movement toward and from the clamped workpiece, pressure fluid operated means for advancing said carriage to feed the saw blade to the workpiece, a first pump connected to supply pressure fluid to said clamp actuator and said carriage advancing means, a second pump connected to supply pressure fluid to said blade driving motor, and conduit means defining a passage for directing pressure fluid from said second pump to said clamp actuator whereby to increase clamping pressure on the workpiece when the load on the saw blade increases.

6. In a band saw having a base, a saw supporting column, and a carriage supporting the column, means supporting and guiding said carriage for reciprocation longitudinally of the base and for restraining it against transverse movements comprising, in combination, means on the base defining a pair of opposed vertically spaced guideways at each side of the base, rollers mounted on said carriage and positioned to extend between the respective guideways, said rollers being arranged in pairs at opposite sides of and adjacent the ends of the carriage, one of the rollers of each pair being adjustable vertically to urge the other roller pair into engagement with the respective opposed guideways and thereby restrain the carriage against the vertical movements, guide bars extending longitudinally of one of said pairs of guideways, the rollers cooperating with said one pair of guideways being peripherally grooved to engage said guide bars and restrain the carriage transversely from movement of the guideways, a cylinder supported on the base at the outer side of one of said pair of guideways and having its axis substantially parallel to that guideway, a piston reciprocable in said cylinder, a piston rod projecting at one end of the cylinder and a coupling plate coupling the projecting end of said piston rod with the adjacent side of the carriage, said guide bars and grooved rollers acting to prevent binding of the carriage on the guideways by the force applied to the carriage through said piston rod and coupling element.

References Cited in the file of this patent

UNITED STATES PATENTS

| | | |
|---|---|---|
| 120,949 | Doane et al. | Nov. 14, 1871 |
| 490,212 | O'Connor | Jan. 17, 1893 |
| 579,382 | Coleman | Mar. 23, 1897 |
| 798,569 | Cleveland | Aug. 29, 1905 |
| 884,548 | Warwick | Apr. 14, 1908 |
| 1,152,696 | Berry | Sept. 7, 1915 |
| 1,280,341 | Wardman | Oct. 1, 1918 |
| 1,381,418 | Hunter | June 14, 1921 |
| 1,794,836 | De Walt | Mar. 3, 1931 |
| 1,961,044 | Hawes et al. | May 29, 1934 |
| 2,083,682 | Balsiger et al. | June 15, 1937 |
| 2,185,304 | Knapp | Jan. 2, 1940 |
| 2,274,923 | Hedgpeth | Mar. 3, 1942 |
| 2,301,028 | Esch | Nov. 3, 1942 |
| 2,365,987 | Zimmerman | Dec. 26, 1944 |
| 2,411,623 | Jaques | Nov. 26, 1946 |
| 2,511,563 | Bullard | June 13, 1950 |
| 2,579,955 | Orescan | Dec. 25, 1951 |
| 2,596,081 | Sacrey | May 6, 1952 |
| 2,598,233 | Deardorff | May 27, 1952 |
| 2,602,987 | Wells | July 15, 1952 |
| 2,604,910 | Crosby | July 29, 1952 |
| 2,607,373 | Crane | Aug. 19, 1952 |
| 2,617,451 | Fink et al. | Nov. 11, 1952 |
| 2,664,118 | Krumbach | Dec. 29, 1953 |
| 2,669,261 | Bowers et al. | Feb. 16, 1954 |
| 2,695,539 | Grueninger | Nov. 30, 1954 |
| 2,714,904 | Bolton | Aug. 9, 1955 |
| 2,744,547 | Sevetz | May 8, 1956 |

FOREIGN PATENTS

| | | |
|---|---|---|
| 517,979 | Germany | Feb. 12, 1931 |